United States Patent Office 2,763,936
Patented Sept. 25, 1956

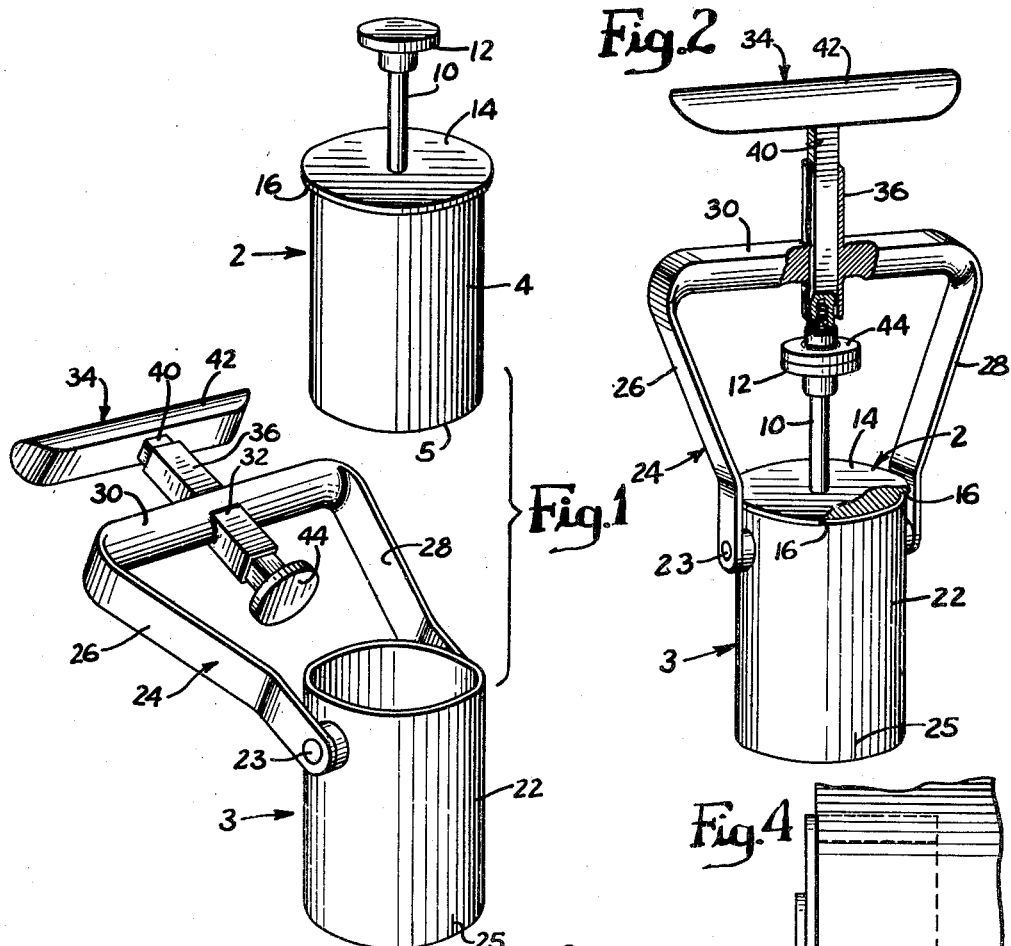
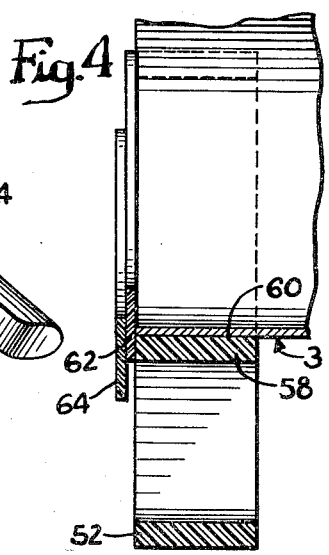
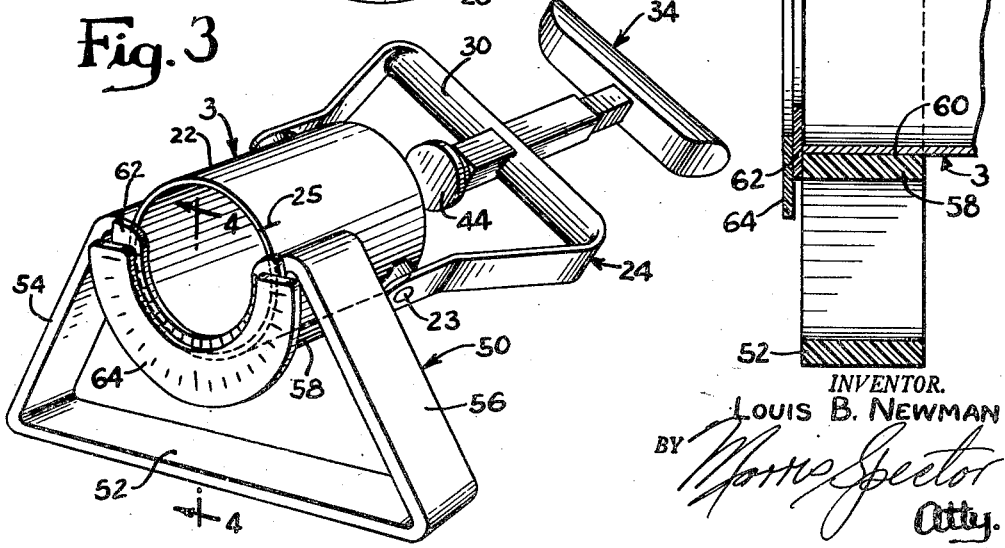

2,763,936

APPARATUS FOR TESTING MUSCLES

Louis B. Newman, Chicago, Ill.

Original application August 21, 1953, Serial No. 375,733. Divided and this application June 9, 1954, Serial No. 436,906

5 Claims. (Cl. 33—174)

This application is a continuation in part of my co-pending application Serial No. 47,777, filed September 4, 1948, and is a division of application Serial No. 375,733 filed August 21, 1953. This invention relates to disability evaluation devices; and one of the objects of this invention is to provide a simple and economical means for testing the degree to which a person can turn his forearm about a longitudinal axis in both possible directions of movement thereof, sometimes referred to as "supination and pronation."

In my former application, above-identified, there is shown a device for measuring muscle strength. This devices operates on the principle of measuring the push exerted by the patient. Another object of this invention is to provide muscle testing apparatus which includes an adapter which is usable with the aforementioned muscle tester disclosed in the co-pending application Serial No. 47,777 as a grip-testing device and also as an element in combination with other apparatus for measuring supination and pronation.

The adapter in this instance, briefly, includes a casing adapted to receive the body of the aforesaid muscle strength testing device. The casing carries a finger gripping member having an aperture and an actuating member slidable therein. A palm-engaging member is connected to one end of the actuating member and the opposite end of the member is adapted to apply force to the force-receiving contact member of the muscle strength testing device. Force exerted between the fingers and palm move the palm-engaging end of said actuating member toward the said finger gripping member and the force is indicated on a gauge associated with the muscle strength testing device.

A shoulder is provided on the casing of the muscle strength testing device body to prevent relative movement between it and the hand-engaging attachment.

Using the adapter as a device for measuring supination or pronation, the aforementioned force-measuring device is removed from the adapter casing which is then journalled in the saddle of a cradle support. A suitable index mark is provided on one end of the adapter casing which index mark cooperates with a measuring scale on the cradle support to indicate the amount of turning movement imparted to the adapter casing by a patient gripping the adapter.

Other features and advantages of the invention will become apparent upon making reference to the specification to follow and the drawings illustrating exemplary embodiments of the invention.

In the drawings:

Fig. 1 is an exploded view of the components making up the grip-testing apparatus of the invention;

Fig. 2 is a perspective view of the apparatus, and partly broken away, of Fig. 1 in assembled condition;

Fig. 3 shows the hand grippable component of Fig. 1 mounted on a cradle support member for use in testing the degree of pronation and supination in a person's arm; and Fig. 4 is a vertical section of the apparatus of Fig. 4 taken along section line 4—4 in the direction of the arrows.

In the various figures, the same reference numerals indicate the same or similar elements throughout.

The grip-testing device of the invention illustrated in the drawings comprises two basic components, namely a force-measuring device 2 and an attachment 3 therefor which is engageable by the hands of an operator.

The force-measuring device has an outer cylindrical casing 4 which surrounds a force indicating gauge (not shown) at the end 5 thereof. Projecting longitudinally from the opposite end of the force-measuring device 2 is a longitudinally movable rod 10 having a cylindrical disc-shaped contact member 12 on the end thereof. The rod 10 extends through an opening in a plate member 14 on one end of the casing 4. The plate member 14 extends beyond the outer surface of the casing 4 to form a transversely extending, annular shoulder 16. Within the casing 4 is a force-measuring device (not shown), of any well known suitable construction, which indicates the amount of force longitudinally applied to the movable rod 10. Such a device is disclosed in said co-pending application Serial No. 47,777.

The other component of the grip-testing device, namely the attachment 3, includes a hollow, open-ended, cylindrical casing or frame member 22 which is adapted to be telescoped or fitted about the cylindrical casing 4 of the measuring device 2.

An index mark 25 is provided for reasons to be explained.

When the casing 22 of the attachment 3 is fully telescoped over the force-measuring device, it abuts the shoulder 16 on the casing 4 to prevent relative axial movement therebetween in one direction. In lieu of the shoulder 16, the casing 22 may be provided with a slight inwardly extending curl at its lower end to act as a stop to limit the insertion of the casing 4 into the casing 22. Pivoted to the outside of the casing 22 about pivot pins 23 which extend through aligned, transverse openings in the casing 22 is a yoke member 24. The yoke member 24 is thus pivotable about an axis transversely to the axis of the casing 22 so that the yoke 24 may be pivoted over one open end thereof. The yoke 24 includes side members 26 and 28 which are connected at their outer ends by a cross-arm 30. Extending transversely and in the center of the cross-arm 30 is a hollow, open-ended sleeve 32 having an aperture therein, of square cross section, which slidably receives the shank 40 of a palm-engaging member, indicated generally by the reference numeral 34. The axis of the aperture in the sleeve 32 is directed toward the contact member 12 of the force-measuring device 2. The shank 40 of the palm-engaging member 34 has a square cross section which is only slightly smaller than the aperture in the sleeve 32. Connected to the outer end of the shank member 40 is a cross bar 42 which is rounded on its outer face to comfortably engage the palm of a hand. Threaded to the opposite end of the shank 40 is a disc-shaped contact member 44 of similar shape to the contact member 12 of the force-measuring device 2.

To assemble the grip-testing device, the yoke member 24 is pivoted to one side of the hollow, cylindrical casing 22, and the gauge end of the casing 4 of the force-measuring device 2 is then placed within the hollow casing 22 of the attachment 3. The yoke member 24 is then pivoted into a position such that the contact member 44 thereof abuts the end of the contact member 12 of the force-measuring device 2, as shown most clearly in Fig. 2. Then the operator grasps the palm-engaging member 34 and cross-arm 30 of the yoke member 24, and the operator then tightly grips the device. In so doing, the longitudinally movable rod 10 applies force to the measuring apparatus within the casing 4 of the measuring device 2 and the force so applied is indicated on the face of the gauge on the end 5 thereof. The shoulder 16 of the measuring device 2 abutting the end of the casing 22 of the attachment 3 prevents relative movement between the parts and enables the ready assembly and disassembly of the components making up the grip testing device.

The attachment 3 may also be utilized in conjunction with a support member, to be described, to provide a device for measuring the degree to which a person may actually rotate his lower arm both in pronation and supination. To this end, the attachment 3 of the grip-testing device just discussed is associated with a cradle support member, generally indicated by the reference numeral 50 (see Figs. 4 and 5). The cradle support member 50 is made of a transparent plastic material and includes a horizontal base plate 52, upstanding side members 54 and 56, and a central cradle or saddle member 58 having a concave upper surface 60, the upper portion of which merges with the top of the side members 54 and 56 respectively. The concave surface 60 conforms in shape to the outside of the casing 22 of the attachment 3 and provides a seat therefor.

Extending inwardly at one end of the concave seat is a transparent flange portion 62, the inner face of which acts as a stop shoulder by abutting the end of the casing 22 of the attachment 3. Secured to the flange 62 is a transparent annular member 64 having suitable index markings thereon for indicating the amount of rotation imparted to the attachment 3.

In operating the device, the attachment 3 is gripped in the same manner as previously described in connection with the grip-testing embodiment of the invention, and the apparatus is rotated on the cradle support member 50. The amount of pronation or supination is indicated by the amount of movement imparted to the adapter or attachment 3 as indicated by the movement of the index mark 25 along the annular scale member 64. Since the flange 62 of the cradle support member and the index member 64 are both transparent, the index mark 25 is visible from the front of the cradle support member for all positions of rotation of the attachment 3.

The present invention thus provides a simple and efficient adapter for testing the strength of one's grip, and which may also be used to measure supination and pronation.

It should be understood that numerous modifications may be made of the specific and preferred embodiments of the invention above described without deviating from the scope of the invention.

I claim:

1. A disability evaluation device comprising an open-ended hollow cylinder having an index marker on the outside thereof, a yoke having a hand grippable cross-arm extending from one end of said cylinder by means of which said cylinder may be rotated about its axis, a support for said cylinder including a curved seat conforming to the shape of said cylinder and on which said cylinder rests, a scale extending about the end of said seat, said index marker on said cylinder being adjacent to said scale whereby the amount of rotation of said cylinder may be readily measured.

2. A disability evaluation device comprising a cylinder having an index marker on the outside thereof, a handle extending from one end of said cylinder by means of which said cylinder may be rotated about its axis, a support for said cylinder including a curved seat conforming to the shape of said cylinder and on which said cylinder rests, a scale extending about the end of said seat, said index marker on said cylinder being adjacent to said scale whereby the amount of rotation of said cylinder may be readily measured, and a shoulder extending inwardly from one end of said seat and against which the end of said cylinder abuts, the cylinder being otherwise free to be moved axially of the seat for removal from and placement onto said seat.

3. A disability evaluation device comprising a cylinder having an index mark on one end thereof, a handle extending from the other end of said cylinder by means of which said cylinder may be rotated about its longitudinal axis, a support for said cylinder including an open-top, horizontally extending seat onto which the cylinder may be readily placed and on which said cylinder may be rotatably supported, and an angle-measuring scale extending about an end of said seat, said index mark on said cylinder end being adjacent to said scale whereby the amount of rotation of said cylinder may be readily measured.

4. A device for measuring pronation and supination and for measuring grip strength comprising, a portable, hollow, open-ended cylinder having a yoke pivotally supported for movement around one end of the cylinder so that a force-measuring device may be telescopingly received within said cylinder by pivoting said yoke to one side of the cylinder, said yoke having a cross-arm to be engaged by all of the fingers on one hand of the operator of the device and supporting a palm-engaging member movable relative to the cross-arm and axially of the cylinder when the yoke is pivoted over one end of the cylinder, an index mark on the other end of said cylinder, and a separate portable saddle member providing a generaly semi-cylindrical bearing conforming in shape to said cylinder and on which said cylinder may be rotated, said support member having a base for supporting the same with said bearing extending in a generally horizontal direction, a transparent end wall on said saddle member providing a shoulder against which the said other end of said cylinder may abut and through which said cylinder index mark is visible, and a scale with angle markings on said end wall for measuring the angle through which the cylinder is turned in said bearing.

5. A device for measuring pronation and supination comprising, a portable cylinder having a cross-arm to be engaged by the fingers on one hand of the operator of the device for turning the cylinder, an index mark on the other end of said cylinder, and a separate portable saddle member providing a generally semi-cylindrical bearing conforming in shape to said cylinder and on which said cylinder may be rotated, said support member having a base for supporting the same with said bearing extending in a generally horizontal direction, a transparent end wall on said saddle member providing a shoulder against which the said other end of said cylinder may abut and through which said cylinder index mark is visible, and a scale with angle markings on said end wall for measuring the angle through which the cylinder is turned in said bearing.

References Cited in the file of this patent

UNITED STATES PATENTS

| 675,678 | Scholder | June 4, 1901 |
| 2,645,025 | Weinerman | July 14, 1953 |

FOREIGN PATENTS

| 115,500 | Great Britain | May 13, 1918 |
| 487,899 | France | Aug. 2, 1918 |
| 915,188 | France | Oct. 29, 1946 |